United States Patent Office 2,965,616
Patented Dec. 20, 1960

2,965,616

LINEAR POLYAMIDES FROM ALIPHATIC DICARBOXY COMPOUNDS AND ALIPHATIC DIAMINES UPGRADED WITH TRANS-1,4-CYCLOHEXANE-DICARBOXYLIC ACID

John R. Caldwell and Russell Gilkey, Kingsport, Tenn., assignors to Eastman Kodak Company, Rochester, N.Y., a corporation of New Jersey No Drawing. Filed Jan. 24, 1957, Ser. No. 635,960

15 Claims. (Cl. 260—78)

This invention relates to upgraded highly polymeric linear fiber-forming copolyamides having melting points of at least 220° C.–240° C. or higher which can be derived from a bifunctional aliphatic diamine containing from 2 to 12 carbon atoms condensed with an equimolecular proportion of a mixture of two bifunctional aliphatic dicarboxylic compounds containing from 2 to 13 carbon atoms composed of from about 15 to 50 mole percent of a trans-1,4-cyclohexanedcarboxylic compound with remainder being an acyclic compound. This invention provides copolyamides which melt at from about 15 to 80 degrees higher temperature than those homopolyamides containing no trans-1,4-cyclohexanedicarboxylic compound. The upgraded copolyamides when compared to the homopolyamides have a broader softening temperature range giving improved processability, decreased tendency to crystallize so that clear extrusions and moldings can be formed, great dyeability of fibers and films and increased initial tensile modulus of elasticity. Fibers can be woven into valuable fabrics. Films are useful for wrapping materials and for their electrical properties. Moldings and extrusions are of high impact strength, excellent rigidity, and possess remarkable resistance to hydrolysis and other valuable characteristics.

In contrast to nylon 66 which is commercially available, these novel upgraded copolyamides have improved dyeability, broader softening temperature range, and other improved physical and chemical characteristics such as greater resistance to hydrolysis, higher melting points in some instances, greater processability, etc.

The employment of aliphatic bifunctional dicarboxylic compounds containing from 2 to 13 carbon atoms and the employment of aliphatic bifunctional diamines containing from 2 to 12 carbon atoms for the preparation of various polyamides has been known to the art for a good number of years as is illustrated in Carothers early patent U.S. 2,130,523 granted September 20, 1938; among the aliphatic dicarboxylic acids disclosed by Carothers is hexahydroterephthalic acid which normally consists of a mixture of isomers which can be said in the language of today to be made up of the cis and trans isomers of 1,4-cyclohexanedicarboxylic acid.

The work begun by Carothers eventually ended in the commercial development of nylon 66 which is derived from the condensation of adipic acid and hexamethylenediamine, both of which components contain 6 carbon atoms. Nylon 66 has a softening temperature around 220° C. and a melting point of about 265° C.

The prior art discloses various copolyamides formed from various components including those employed in the preparation of nylon 66 wherein the additive component or components are introduced to improve dyeability or for other purposes. Work has been done pertaining to the preparation of block polymers with a view toward improving dyeability and other physical and chemical characteristics. Most polyamides which can be simply formed from mixtures of three components have been found to have low melting points and to be of little practical value. Such copolyamides generally melt well below 200° C.

The results of employing three components in the formation of copolyamides were studied by Flory who developed a widely accepted rule which states that interpolymers melt well below the homopolymer: Thus if component A was added during the formation of polymer B, the melting point of polymer B would be depressed according to the molecular proportion of A. This rule is discussed at considerable length by Flory in J. Am. Chem. Soc. 72, 2024 (1950), see also J. Chem. Phys., 17, 223 (1949). The theoretical derivation is given for this rule along with considerable verification. This melting point rule has been widely accepted in the field of polymer science and is often called Flory's Melting Point Law. The general validity has been established for polyesters and polyamides.

The polyamides of this invention represent an exception to Flory's rule and thereby add an important contribution to the art which also has considerable economic value because the polyamides of many members of the class derived from the condensation of dicarboxylic acids containing from 2 to 13 carbon atoms with diamines containing from 2 to 12 carbon atoms are of relatively low melting point, especially where the number of the carbon atoms in the chain is much above 6. Moreover, the upgrading of the melting point is also accompanied by an upgrading of the initial tensile modulus of elasticity, the hydrolytic stability, and various other chemical and physical characteristics.

According to the definitions used by Flory, a copolyamide is named according to the component that is present in the larger amount on a molar basis. That is, a copolyamide that contains more than 50 mole percent of adipic acid and less than 50 mole percent of sebacic acid is considered to be an adipic acid polyamide and the sebacic acid is considered as the component which depresses the melting point of the adipic acid polyamide. The same principle applies if the copolyamide contains a mixture of diamines. Flory states that the melting point depression is very nearly independent of the co-ingredient used.

For the purpose of further illustrating Flory's rule, some data is presented in the table below. In this table, the co-ingredient is described as 6—10, 6—6, etc. wherein the first figure refers to the number of carbon atoms in a bifunctional straight-chain diamine and the second figure represents the number of carbon atoms in a bifunctional straight chain dibasic acid. Thus, 6—6 is nylon 66 and 10—6 is polymerized decamethylene adipamide.

COPOLYAMIDES OF DECAMETHYLENE SEBACAMIDE

| Co-Ingredient | Mole Fraction of Decamethylene Sebacamide | Melting Point, °C. |
|---|---|---|
| None | 1.0 | about 209 |
| 10-Terephthalic | 0.9 | 203–204 |
| 6-10 | 0.9 | 203–204 |
| 6-10 | 0.8 | 195–197 |
| 10-6 | 0.8 | 195–197 |
| 10-Isophthalic | 0.8 | 195–197 |
| 6-6 | 0.8 | 195–197 |
| 6-10 | 0.7 | about 188 |
| 6-10 | 0.6 | about 181 |

It can be seen from this table that the melting point of the homopolymer (209° C.) is depressed in a regular manner, depending upon the mole fraction of the co-ingredient present, even though the co-ingredient melts higher than the homopolyamide, for example, 6—6 melts at 264° C. and 10-terephthalic melts above 300° C. and yet, as a co-ingredient, each of these reduces the melting point of the decamethylene sebacamide homopolyamide to well below 209° C.

It has been noted that the copolyamide of adipic acid and terephthalic acid with hexamethylenediamine does not show the depression of melting point that would be predicted from Flory's rule. However, these two acids are almost identical in chain length and hence give isomorphous crystals. That is, they both fit into the same crystal lattice and there is no disturbance of the crystal structure. The physical-chemical laws of melting point depression do not apply to isomorphous systems.

Various homopolyamides which can be upgraded in accordance with the present invention together with an example of the upgraded copolyamide showing the mole percentage of the components along with a melting point of the homopolyamide and copolyamide are given in the table below in order to illustrate in tabular form a few examples of this invention:

| Components of the Polyamide and Mole Percent | | Melting Point of Polyamide, ° C. | Increase in Melting P., ° C. |
|---|---|---|---|
| Major Component | Minor Component | | |
| 100% (6-10) | none | 210 | |
| 70% (6-10) | 30% (6-CHDC) | 257-278 | 47-68 |
| 100% (5-6) | none | 223 | |
| 80% (5-6) | 20% (5-CHDC) | 260-281 | 37-58 |
| 100% (6-7 Branched) | none | 200 | |
| 75% (6-7 Branched) | 25% (6-CHDC) | 251-269 | 51-69 |
| 100% (4-11) | none | 228 | |
| 70% (4-8) | 30% (4-CHDC) | 248-260 | 40-52 |
| 100% (6-6) | none | 264 | |
| 80% (6-6) | 20% (6-CHDC) | 280-295 | 16-31 |

In the above table the symbols have the same meaning as in the first table and CHDC represents trans 1,4-cyclohexanedicarboxylic acid. The degree of upgrading provided by this invention is quite remarkable. Especially noteworthy is the great improvement in the branched chain polyamides. That such high melting useful copolyamides could be prepared from branched chain components was most unexpected and represents an aspect of this invention clearly distinct and separate from the upgrading of the straight chain homopolymers. The same applies to the upgrading of homopolymers derived from 1,3-cyclohexane-bis(methylamine).

It is an object of this invention to provide a linear highly polymeric fiber-forming upgraded polyamide derived for the most part from the condensation of an acyclic aliphatic bifunctional dicarboxylic compound with an aliphatic bifunctional diamine employing trans-1,4-cyclohexane dicarboxylic acid as the upgrading component.

An additional object of this invention is to provide a process for preparing copolyamides from an aliphatic dibasic acid and an aliphatic diamine wherein the process is modified by incorporating a substantial proportion of an upgrading component which is trans-1,4-cyclohexanedicarboxylic acid.

The aliphatic dicarboxylic bifunctional acyclic compounds containing from 2 to 13 carbon atoms which can be employed in accordance with this invention are illustrated by oxalic acid, dimethylmalonic acid, succinic acid, glutaric acid, adipic acid, β-methyl-adipic acid, pimelic acid, suberic acid, azelaic acid, sebacic acid, undecane-1,11-dioic acid, 3,3-dimethyl-glutaric acid, β,γ-dimethyl-succinic acid, and other dicarboxylic acids having from one to two methyl or ethyl radicals attached to the main hydrocarbon chain in a position preferably in an α-relationship to a carboxyl radical, e.g. 4-methyladipic acid, 5-methylsuberic acid, 3,3-dimethyladipic acid, etc. The bifunctional aliphatic diamines containing from 2 to 12 carbon atoms which can be employed in accordance with this invention include all of the compounds which are analogous to the dicarboxy compounds specifically named in this same paragraph, for example, ethylenediamine, tetramethylenediamine, 2,2-dimethyl-1,5-diaminopentane, pentamethylenediamine, hexamethylenediamine, 1,12-diaminododecane, 3,6-diethyl-1,8-diaminooctane, etc.

A particularly valuable object of this invention pertains to the upgrading of those polyamides derived from branched chain aliphatic dibasic acids and/or branched chain aliphatic diamines, especially the alicyclic 1,3-cyclohexanebis-(methylamine).

A further object of this invention is to provide fibers, films, molded objects, compositions and other materials of improved utility.

Additional objects will become apparent hereinafter.

According to a principal embodiment of this invention, it has been found that a great improvement can be achieved in the class of linear highly polymeric fiber-forming polymers formed by the condensation of a bifunctional aliphatic dicarboxylic compound containing from 2 to 13 carbon atoms with a bifunctional aliphatic diamine containing from 2 to 12 carbon atoms, the improvement consisting of having from about 15 to about 50 mole percent of the polyamide derived by replacing a corresponding proportion of the aliphatic dicarboxylic compound with a trans-1,4-cyclohexanedicarboxylic compound, whereby the upgraded copolyamides soften or melt at a temperature of from 15 to 80 degrees higher than the corresponding homopolyamides, soften over a range of from about 10 to about 20 degrees, have improved affinity for dyes, have decreased tendency to crystallize, and have increased initial tensile modulus of elasticity.

According to another embodiment of this invention the novel copolyamides of this invention can be prepared by a process which essentially comprises condensing an aliphatic bifunctional diamine with two bifunctional dicarboxy compounds, one of which is an acyclic dicarboxy compound containing from about 2 to about 13 carbon atoms which constitutes at least 50 mole percent of said bifunctional dicarboxy compounds and the other is trans-1,4-cyclohexanedicarboxylic compound which constitutes from 15 to 50 mole percent of said bifunctional dicarboxy compounds.

In this specification the terms "bifunctional diamine" and "bifunctional dicarboxylic compound" are used in a sense which is intended to cover their use separately or in the form of salts which can be made in accordance with techniques well known in the polyamide art.

The condensation can generally be advantageously accomplished by heating the diamine with the two dicarboxy compounds or a suitable derivative thereof under conditions that produce a polyamide. Most advantageously, salts of the diamine and the dicarboxy compounds can be formed and then heated at an elevated temperature of from about 200° C. to about 320° C. for several hours in a closed vessel in an inert atmosphere. It is advantageous to carry out the first stage of the heating cycle under pressure in order to prevent the escape of volatile reactants, followed by performing the final stage of polymerization at atmospheric pressure or under a vacuum. The employment of purified salts assures that the diamine and dicarboxylic compounds are employed in equivalent amounts. Solvents such as cresol or xylenol can be employed during the reaction. Other known techniques can be employed in preparing the copolyamides of this invention. Such techniques are well known in the art and are illustrated in numerous patents and publications. It is not believed necessary or desirable to go into all of the variations and ramifications which can be employed in preparing the copolyamides of this invention.

In order to be suitable for the manufacture of films, fibers, sheets and molded objects, the copolyamide should have an inherent viscosity of about 0.4 or higher. Generally, such a viscosity of 0.6 to 0.8 as determined in a solvent composed of 60 parts of phenol and 40 parts of tetrachloroethane produces a copolyamide of advantageous properties. In some instances where a particularly high inherent viscosity is not desired, it may be desirable to add a chain terminator or stabilizer such as acetic acid or benzoic acid to the reaction mixture in order to keep the viscosity from exceeding the desired range.

The copolyamides of this invention can be formed into fibers, films, extrusions, molded objects, coating compositions, etc. using those techniques well known in the art for melt spinning, extruding, etc.

The present invention provides highly polymeric linear copolyamides having a melting point of from about 220–240° C. up to about 300° C., having a softening temperature extending over a range of from about 10 to about 20 degrees, having excellent dye receptivity and having a reduced tendency to crystallize whereby clear molded and extruded objects can be formed, essentially composed of recurring structural units having the following formulas:

(A)
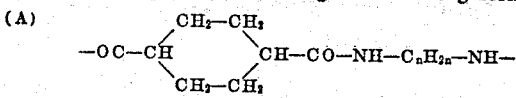

and (B) —OC—$C_m$—$H_{2m}$—CO—NH—$C_nH_{2n}$—NH— wherein units (A) constitute on the average from about 15 to 50 percent of each polymeric molecule, $n$ represents an integer of from 2 to 12 and $m$ represents an integer of from 2 to 13, each of the groups $C_nH_{2n}$ and $C_mH_{2m}$ having no more than two carbon atoms on any one side chain. Even when there are no side chains, the minimum melting point is about 240°; however there are some polyamides having side chains melting in the 220°–240° range. The $C_nH_{2n}$ radicals in either of Formulas A and B above can be replaced by cyclohexanedimethylene radicals as indicated above in the objects of this invention, in the examples below and elsewhere in this specification. Thus, the cyclohexanedimethylene radicals and the —$C_nH_{2n}$— radicals can be represented by the symbol X for convenience in designating such radicals.

More particularly this invention provides upgraded highly polymeric branched chain copolyamides having a minimum melting point of about 220° C., having a softening temperature extending over a range of from about 10 to 20 degrees, having an increased melting point of from about 40 to 100 degrees, having improved dye receptivity and having reduced tendency to crystallize, such properties being relative to the corresponding homopolyamide containing no residue derived from trans-1,4-cyclohexanedicarboxylic acid, which copolyamide is essentially composed of recurring structural units having the following formulas:

(A)
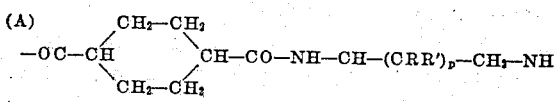

and (B) —OC—$CH_2$—(CR″R‴)$_q$—$CH_2$—CO—NH
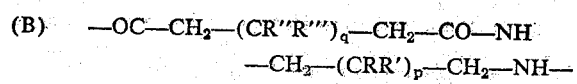
—$CH_2$—(CRR′)$_p$—$CH_2$—NH— wherein units (A) constitute on the average from about 15 to 50 percent of each polymeric molecule, each of R, R′, R″ and R‴ represents a member selected from the group consisting of hydrogen, methyl and ethyl and each $p$ and $q$ represents an integer of from 1 to 8, each —(CRR′)$_p$— group containing from ($p$+1) to ($p$+4) carbon atoms but no more than a total of 10 carbon atoms, and each —(CR″R‴)$_q$— group containing from ($q$+1) to ($q$+4) carbon atoms but no more than a total of 11 carbon atoms. The —(CRR′)$_p$— radicals in either or both of Formulas A and B above can be replaced by a divalent cyclohexane radical as indicated above in the objects of this invention, in the examples below and elsewhere in this specification. Thus, the divalent cyclohexane radicals and the —(CRR′)$_p$— radicals can be represented by the symbol Y for convenience in designating such radicals.

Many of the branched chain dicarboxy compounds and diamines have been mentioned above. The preparation of branched chain adipic acid compounds from aromatic starting materials has been developed to a point where such branched chain acids can form valuable components for polyamides when upgraded in accordance with this invention. Thus a new source of cheap raw materials can now be employed to produce valuable commercially practicable copolyamides.

This invention can be further illustrated by the following examples of preferred embodiments although it will be understood that these examples are included merely for purposes of illustration and are not intended to limit the scope of the invention unless otherwise specifically indicated:

*Example 1*

A mixture of 222.6 g. (0.7 mole) of hexamethylenediammonium sebacate, 86.4 g. (0.3 mole) of hexamethylenediammonium trans-cyclohexane-1,4-dicarboxylate, and 100 ml. of water was charged into a stainless steel reaction vessel. The reaction vessel was purged with nitrogen and then further purged of air by heating to 120° C. and releasing a small amount of water vapor. The release valve was closed and the autoclave was heated to 260° C. while maintaining a pressure of about 60 p.s.i. After two hours, the pressure was slowly bled to atmospheric and heating was continued at 270°–275° C. for one hour. The resulting colorless interpolyamide was extruded from the reactor by nitrogen pressure. The inherent viscosity of the polymer, as measured in 60 phenol-40-tetrachloroethane, was 0.93. The microcrystalline melting point, as measured under crossed nicols on the hot stage of a microscope, was 257–278° C. The melting point of the homopolymer made from sebacic acid and hexamethylenediamine is 210° C. The upgraded copolyamide was moderately crystalline and could be melt spun into fibers which could be cold-drawn and heat-set. The fibers dyed readily with disperse dyes. The polymer was also valuable as a molding material. The relatively wide melting range increased the ease of processing in extrusion. Clear, transparent films and molded articles were obtained.

*Example 2*

A mixture of 4.96 g. (0.02 mole) of the salt of pentamethylenediamine and adipic acid, 1.37 g. (0.005 mole) of the salt of pentamethylenediamine and trans-cyclohexane-1,4-dicarboxylic acid 0.5 ml. of water was heated in an evacuated, sealed tube at 250° C. for one hour. A white, opaque prepolymer was obtained. It was further polymerized by heating in an atmosphere of nitrogen at 285° C. for one hour. Fibers drawn from the melt could be cold-drawn and were very tough. The polymer had an inherent viscosity of 0.68 and a melting point range of 260–281° C. The homopolyamide made from pentamethylenediamine and adipic acid melts at 223° C. The upgraded copolyamide is especially useful in the manufacture of film and fibers. The fibers dye more readily and to deeper shades than the homopolymer. The product also possesses a higher modulus of elasticity than the straight aliphatic homopolymer.

*Example 3*

The following ingredients were heated in a 100-ml. flask in an atmosphere of nitrogen at 220° C. for four hours: 4.64 g. (0.04 mole) hexamethylenediamine, 4.8 g. (0.03 mole) β-methyladipic acid, 1.72 g. (0.01 mole) trans-cyclohexane-1,4-dicarboxylic acid, and 8 ml. cresol. A viscous solution was obtained from which the polymer was isolated by precipitation in acetone. The precipitated polymer was further extracted with methanol in order to remove the cresol. This copolyamide had an inherent viscosity of 0.72 and a melting point range of 251–269° C. It was useful in making clear, transparent film and molded articles. The homopolyamide made from β-methyladipic acid and hexamethylenediamine melted at 200° C.

Example 4

A copolyamide was prepared from a 70 to 30 molar ratio of the tetramethylenediamine salts of undecanedioic acid and trans-cyclohexane-1,4-dicarboxylic acid. The polymer had a melting range of 248–260° C. Its high impact strength and heat distortion temperature coupled with its ability to give clear moldings make it very valuable as a molding plastic. The polyamide made from tetramethylenediamine and undecanedioic acid melts at 208° C.

Example 5

A copolyamide was prepared having the composition 65 mole percent sebacic acid, 35 mole percent trans-cyclohexane-1,4-dicarboxylic acid, and 100 mole percent decamethylenediamine. The polymer had a crystalline melting range of 254–269° C. and could be melt extruded or pressed into films and sheets of excellent clarity. The polyamide made from decamethylenediamine and sebacic acid melts at 208° C.

Example 6

A copolyamide was prepared having the composition 60 mole percent adipic acid, 40 mole percent trans-cyclohexane-1,4-dicarboxylic acid, and 100 mole percent 3-methylhexamethylenediamine. The homopolymer of adipic acid and the diamine melts at about 180° C. Incorporating the trans-cyclohexane-1,4-dicarboxylic acid into the polymer raised the melting point about 70–80° C. The interpolymer could be melt extruded into fibers having good physical properties and excellent dyeability.

Example 7

A copolyamide was made from 54 mole percent adipic acid, 46 mole percent trans-1,4-cyclohexanedicarboxylic acid, and 100 mole percent 1,3-cyclohexanebis(methylamine). It softened in the range of 240°–260° C. and was useful as a molding plastic.

Example 8

A copolyamide was made from 80 mole percent adipic acid, 20 mole percent trans-1,4-cyclohexanedicarboxylic acid and 100 mole percent hexamethylenediamine. It melted in the range of 280–290° C. and was valuable for the production of fibers. The homopolymer made from adipic acid and hexamethylenediamine melts at 264° C.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A highly polymeric linear copolyamide having a melting point of from about 240° C. up to about 300° C., having a softening temperature extending over a range of from about 10 to about 20 degrees, having excellent dye receptivity and having a reduced tendency to crystallize whereby clear molded and extruded objects can be formed, essentially composed of recurring structural units having the following formulas:

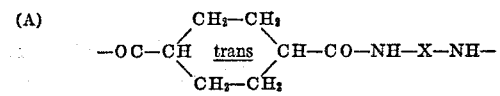

and

wherein units (A) constitute on the average from about 15 to 50 percent of each polymeric molecule, X represents a radical selected from the group consisting of a

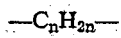

radical and a cyclohexanedimethylene radical, $n$ represents an integer of from 2 to 12 and $m$ represents an integer of from 2 to 13, each of the groups $C_nH_{2n}$ and $C_mH_{2m}$ having no more than two carbon atoms on any one side chain.

2. A copolyamide as defined in Claim 5 wherein the recurring structural units are, respectively:

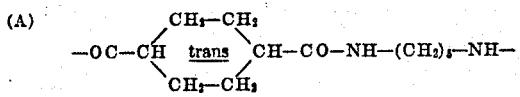

and

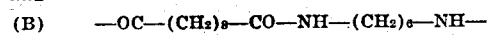

3. A copolyamide as defined in claim 1 wherein the recurring structural units are, respectively:

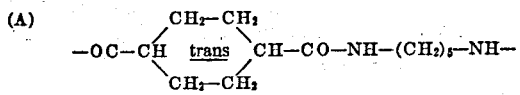

and

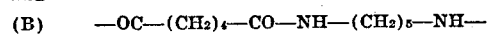

4. A copolyamide as defined in claim 1 wherein the recurring structural units are, respectively:

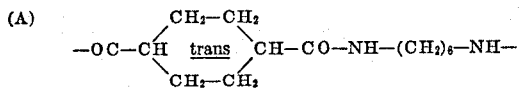

and

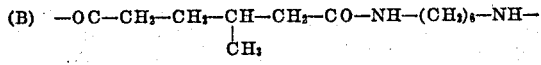

5. A copolyamide as defined in claim 1 wherein the recurring structural units are, respectively:

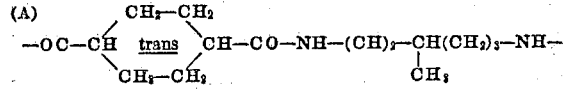

and

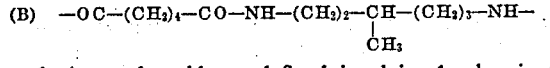

6. A copolyamide as defined in claim 1 wherein the recurring structural units are, respectively:

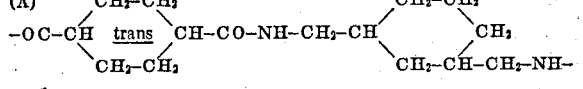

and

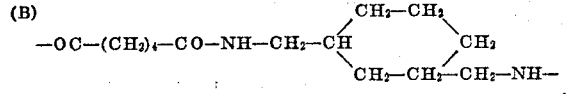

7. An upgraded highly polymeric linear branched-chain copolyamide having a minimum melting point of about 220° C., having a softening temperature extending over a range of from about 10 to 20 degrees, having an increased melting point of from about 40 to 100 degrees, having improved dye receptivity and having reduced tendency to crystallize, such properties being relative to the corresponding homopolyamide containing no residue derived from trans-1,4-cyclohexanedicarboxylic acid, which copolyamide is essentially composed of recurring structural units having the following formulas:

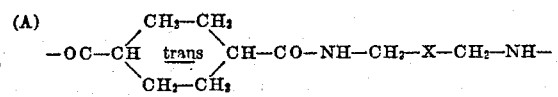

and

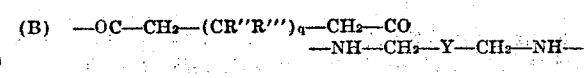

wherein units (A) constitute on the average from about 15 to 50 percent of each polymeric molecule, Y represents a radical selected from the group consisting of a

radical and a divalent cyclohexane radical each of R, R', R" and R'" represents a member selected from the group consisting of hydrogen, methyl and ethyl and each $p$ and $q$ represents an integer of from 1 to 8, each $-(CRR')_p-$ group containing from $(p-1)$ to $(p+4)$ carbon atoms but no more than a total of 10 carbon atoms, and each $-(CR''R''')_q-$ group containing from $(q+1)$ to $(q+4)$ carbon atoms but no more than a total of 11 carbon atoms.

8. A film of a copolyamide as defined in claim 1.
9. A fiber of a copolyamide as defined in claim 1.
10. A film of a copolyamide as defined in claim 4.
11. A fiber of a copolyamide as defined in claim 4.
12. A film of a copolyamide as defined in claim 5.
13. A fiber of a copolyamide as defined in claim 5.
14. A film of a copolyamide as defined in claim 6.
15. A fiber of a copolyamide as defined in claim 6.

References Cited in the file of this patent

UNITED STATES PATENTS

| | | |
|---|---|---|
| 2,130,523 | Carothers | Sept. 20, 1938 |
| 2,268,586 | Gilman | Jan. 6, 1942 |
| 2,625,536 | Kirby | Jan. 13, 1953 |

FOREIGN PATENTS

| | | |
|---|---|---|
| 873,983 | France | Apr. 13, 1942 |

OTHER REFERENCES

Hill et al.: J. Polymer Science, vol. 3, 1948, pp. 609, 619–621.

Edgar et al.: J. Polymer Science, vol. 8, 1952, pp. 1, 4, 5 and 6, 15–19.

Batzer et al.: Makromole Chemie, vol. 11, 1953, pp. 85–86.

Evans et al.: J. Amer. Chem. voc., vol. 72, 1950, pp. 2018–2028.

UNITED STATES PATENT OFFICE
CERTIFICATION OF CORRECTION

Patent No. 2,965,616                                December 20, 1960

John R. Caldwell et al.

It is hereby certified that error appears in the above numbered patent requiring correction and that the said Letters Patent should read as corrected below.

Column 5, line 23, for that portion of formula B reading "$C_m-H_{2m}$" read -- $C_mH_{2m}$ --; line 51, for that portion of formula A reading "-CH-" read -- $-CH_2-$ --; column 8, line 3, for the claim reference numeral "5" read -- 1 --; line 6, right-hand portion of the formula, for "$-(CH_2)_5-NH-$" read -- $-(CH_2)_6-NH-$ --; claim 6, for that portion of the formula reading "$\diagdown CH_2-CH\diagup-CH_2-NH-$" read -- $\diagdown CH_2-CH\diagup CH_2-NH-$ --; same column 8, claim 7, first formula, for "$-X-CH_2-NH-$" read -- $-Y-CH_2-NH-$ --.

Signed and sealed this 6th day of June 1961.

(SEAL)
Attest:

ERNEST W. SWIDER                                DAVID L. LADD
Attesting Officer                                Commissioner of Patents